H. L. BAILEY.
WINDOW CLEANER.
APPLICATION FILED MAY 14, 1906.
911,194.   Patented Feb. 2, 1909.
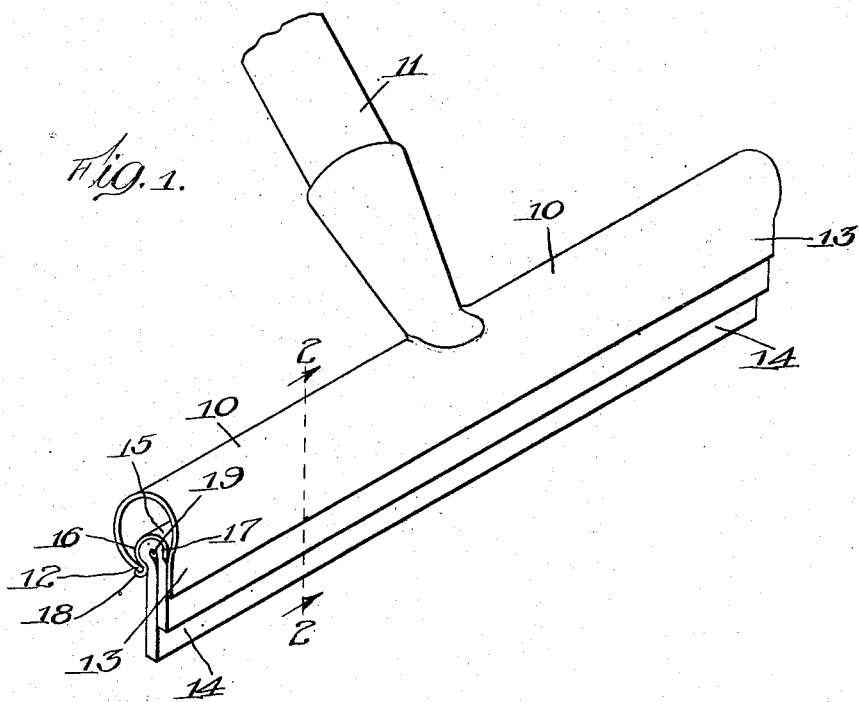
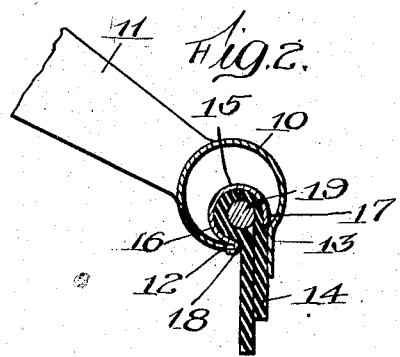
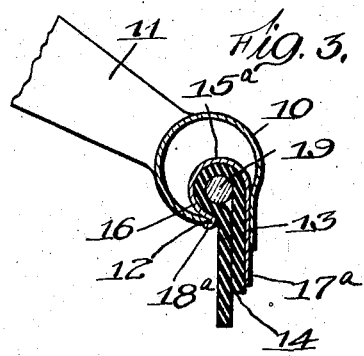
Witnesses:
G. V. Domarus
U. T. Bird
Inventor:
Herbert L. Bailey
by Brown, Darby & Hopkins
Attys

UNITED STATES PATENT OFFICE.

HERBERT L. BAILEY, OF LUDINGTON, MICHIGAN, ASSIGNOR TO HANDY THINGS COMPANY, OF LUDINGTON, MICHIGAN, A CORPORATION OF ILLINOIS.

WINDOW-CLEANER.

No. 911,194.  Specification of Letters Patent.  Patented Feb. 2, 1909.

Application filed May 14, 1906. Serial No. 316,751.

*To all whom it may concern:*

Be it known that I, HERBERT L. BAILEY, a citizen of the United States, residing at Ludington, in the county of Mason and State of Michigan, have invented certain new and useful Improvements in Window-Cleaners, of which the following is a full, clear, and exact specification.

This invention relates to improvements in window cleaners, and the object of the same is to provide improved means for fastening or securing a rubber or wiper to the holder or handle.

A further object is to provide improved means for removably securing or fastening the rubber or wiper in position, with a minimum amount of material.

A further object is to provide an improved device of this character which will be light in weight, simple and durable in construction and cheap to manufacture.

To the attainment of these ends and the accomplishment of other new and useful objects as will appear, the invention consists in the features of novelty in the construction, combination and arrangement of the several parts hereinafter more fully described and claimed and shown in the accompanying drawing, illustrating an exemplification of this invention, and in which:—

Figure 1 is a perspective view of a window cleaner constructed in accordance with the principles of this invention. Fig. 2 is a sectional view on line 2—2 of Fig. 1. Fig. 3 is a sectional view similar to Fig. 2 of a modified form of the invention.

Referring more particularly to the drawing the numeral 10 designates generally the head or holder of the cleaner, which is provided with a suitable handle socket 11. This head or holder may be constructed of any suitable material preferably of thin sheet metal, in the shape of a slotted tube, one edge of which is bent outwardly and away from the other side 12 to form a longitudinal flange or bearing 13, which preferably projects beyond the side 12. The wiper proper 14, may be of any suitable material but is preferably constructed of rubber folded upon itself as shown. A lock or key 15 is provided for the wiper, and is preferably in the shape of a split tube, one edge 16 of which is bent away from the other edge 17 and the extremity 18 thereof is bent back to form a rearwardly curved or hooked portion. This form of the invention is assembled by bending or folding the wiper 14 upon itself and sliding the bent or folded portion into the lock or key, from the end thereof so that the extremities of the wiper will project through the opening in the key.

A rod or bar 19 is placed between the folds of the wiper 14, by inserting the same through the end of the lock or key 15. The opening in the lock or key through which the extremities of the wiper pass is of such a size that when the rod or bar 19, is in position the wiper will be prevented or held from lateral displacement with respect to the lock or key 15. These assembled parts may then be inserted into the head or holder 10, from one end, so that the side 12 of the holder will enter the hooked or curved extremity 18 of the lock or key 15 and the edge 17 of said key will engage and rest upon the inner face of the holder or head 10 at a point, inside thereof and adjacent the opening therein. In this position one of the folds of the wiper 14, will rest against the flanged or bent portion 13, while the other fold will rest against the bent portion 16, of the key or lock 15.

The opening in the head or holder 10, through which the end 18 of the key or lock and the extremities 14 of the wiper passes is of a size to clamp the wiper and prevent the same together with the lock or key and rod from being displaced laterally with respect to the holder 10.

In the modified form shown in Fig. 3, the edge 17$^a$ of the lock or key 15$^a$ is continued and projects beyond the edge 18$^a$ and also preferably beyond the flanged portion 13 of the head or holder 10, so that when the key or lock 15$^a$ is inserted into the holder through one end thereof, the side or edge 17$^a$ will be parallel with and rest against the inner face of the flanged portion 13. This construction will clamp the rubber or wiper between the two sides of the lock or key 15$^a$, instead of between one side of the lock or key and the wall or flanged portion of the head or holder 10. With such an arrangement it will be seen that the diameter of the head or holder 10 may be of any desired size and that the wiper or rubber does not completely fill the head, but that only a small portion thereof projects into and is locked within the head, thereby necessitating the minimum amount of rubber for the wiper, which at the same time will be securely held and which may be readily removed for renewal. It will be noted that the internal diameter of the holder is considerably larger than the diameter of the lock or key, so as to leave a space between the two. This arrangement not only permits the holder to be formed of any desired size but being so constructed, very thin material may be used, for the sake of lightness, and at the same time the parts are so constructed and secured together as to insure rigidity and strength, while only a minimum amount of material is necessary in order to firmly secure the rubber or wiper in position.

It is to be understood that it is not desired to be limited to the exact details of construction or the arrangement of the several parts as numerous changes may be made therein without departing from the spirit of the invention.

What is claimed as new, is:—

1. In a window cleaner, the combination of a longitudinally slotted tubular lock or key, one side of the slot being bent back and away from the slot to form a seat, the other side of the slot being formed into a flange and extended for some distance beyond the first said side, a wiper, means for securing the wiper to the key and a longitudinally slotted tubular holder of a diameter somewhat larger than the diameter of the key, one side of the slot being formed into a flange extending beyond the other side, said key being adapted to be inserted longitudinally into the holder so that the wiper will extend through the slot therein and the flange on the key will engage and rest against the flange on the holder and with the other side of the slot resting within the seat so that the said bent portion will engage over the edge of the holder whereby the wiper will be clamped in position.

2. In a window cleaner, the combination of a longitudinally slotted tubular lock or key, one side of the slot being bent back and away from the slot to form a seat, the other side of the slot being formed into a flange and extended for some distance beyond the first said side, a wiper comprising a strip of flexible material folded upon itself, a rod or bar inserted between the folds, said folded portion and bar being inserted into the lock or key through the end thereof and with the wiper projecting laterally through the slot, and a longitudinally slotted tubular holder of a diameter somewhat larger than the diameter of the key, one side of the slot being formed into a flange extending beyond the other side, said key being adapted to be inserted longitudinally into the holder, so that the wiper will extend through the slot therein and the flange on the key will engage and rest against the flange on the holder and with the other side of the slot resting within the seat so that the said bent portion will engage over the edge of the holder whereby the wiper will be clamped in position.

In testimony whereof I have signed my name to this specification, in the presence of two subscribing witnesses, on this 10th day of May A. D. 1906.

HERBERT L. BAILEY.

Witnesses:
JAMES R. LANE,
HATTIE TIEDEMANN.